United States Patent
Ljung et al.

(10) Patent No.: US 11,601,953 B2
(45) Date of Patent: Mar. 7, 2023

(54) COEXISTENCE OF PERSISTENT AND DEDICATED ALLOCATIONS ON A WIRELESS LINK

(71) Applicant: Convida Wireless, LLC, Wilmington, DE (US)

(72) Inventors: Rickard Ljung, Helsingborg (SE); Nafiseh Mazloum, Lund (SE); Kåre Agardh, Rydebäck (SE)

(73) Assignee: Convida Wireless, LLC

( * ) Notice: Subject to any disclaimer, the term of this patent is extended or adjusted under 35 U.S.C. 154(b) by 0 days.

(21) Appl. No.: 16/979,866

(22) PCT Filed: Mar. 22, 2019

(86) PCT No.: PCT/EP2019/057273
§ 371 (c)(1),
(2) Date: Sep. 11, 2020

(87) PCT Pub. No.: WO2019/180222
PCT Pub. Date: Sep. 26, 2019

(65) Prior Publication Data
US 2021/0045136 A1  Feb. 11, 2021

(30) Foreign Application Priority Data
Mar. 23, 2018  (SE) .................................... 1830095-4

(51) Int. Cl.
*H04W 72/12* (2009.01)
(52) U.S. Cl.
CPC .............................. *H04W 72/1205* (2013.01)

(58) Field of Classification Search
CPC ... H04L 5/0053; H04L 5/0044; H04L 1/1854; H04W 72/04
See application file for complete search history.

(56) References Cited

U.S. PATENT DOCUMENTS

| 7,948,941 B2 * | 5/2011 | Kwon | H04W 72/04 370/328 |
| 2011/0194538 A1 * | 8/2011 | Zheng | H04W 76/28 370/335 |

(Continued)

FOREIGN PATENT DOCUMENTS

| WO | 2008/097019 A1 | 8/2008 |
| WO | WO-2008097019 A1 * | 8/2008 ............ H04W 72/14 |

OTHER PUBLICATIONS

International Search Report and Written Opinion dated May 15, 2019 for PCT/EP2019/057273 filed on Mar. 22, 2019, 10 pages.

(Continued)

*Primary Examiner* — Romani Ohri
(74) *Attorney, Agent, or Firm* — BakerHostetler

(57) ABSTRACT

A method of operating a device (101, 102, 112) includes implementing (7001) a persistent allocation (281) of a plurality of first resources (251) to a first channel (261, 263) of a wireless link (114) supported by an access node (112); and temporarily overriding (7004) the persistent allocation (281) for a subset (251 A) of the plurality of first resources (251); and while overriding (7004): implementing (7005) a dedicated allocation (282) of a plurality of second resources (252) to a second channel (262) of the wireless link (114).

20 Claims, 9 Drawing Sheets

(56) References Cited

U.S. PATENT DOCUMENTS

| | | | | |
|---|---|---|---|---|
| 2012/0082101 A1* | 4/2012 | Gaal | ................ | H04W 72/1268 |
| | | | | 370/329 |
| 2016/0007322 A1* | 1/2016 | Agardh | ................ | H04W 72/04 |
| | | | | 370/329 |
| 2017/0171877 A1* | 6/2017 | Wang | .................... | H04L 5/0096 |
| 2017/0251499 A1* | 8/2017 | Radulescu | .......... | H04L 41/0866 |
| 2017/0279959 A1* | 9/2017 | Karimi-Cherkandi | ....................... | |
| | | | | H04Q 11/0428 |
| 2018/0098341 A1* | 4/2018 | Wang | ................ | H04W 72/1278 |
| 2018/0160445 A1* | 6/2018 | Babaei | ................ | H04W 72/042 |

OTHER PUBLICATIONS

CATT, "UE behavior on configured grant timer upon DCI reception," 3GPP TSG-RAN WG2 NR AH-1801, R2-1800165, Vancouver, Canada, Jan. 26-27, 2018, pp. 1-6.

LG Electronics Inc., "Prioritization between dynamic grant and configured grant for URLLC," 3GPP TSG-RAN2 NR AH 1801, R2-1801239, Vancouver, Canada, Jan. 22-26, 2018, pp. 1-2.

NEC, "Frequency hopping schemes for NR UL PUSCH," 3GPP TSG RAN WG1 Meeting No. 91, R1-1720900, Reno, Nevada, US, Nov. 27-Dec. 1, 2017, pp. 1-5.

* cited by examiner

COEXISTENCE OF PERSISTENT AND DEDICATED ALLOCATIONS ON A WIRELESS LINK

CROSS-REFERENCE TO RELATED APPLICATIONS

The present application is based on PCT filing PCT/EP2019/057273, filed Mar. 22, 2019, which claims priority to SE 1830095-4, filed Mar. 23, 2018, the entire contents of each are incorporated herein by reference.

TECHNICAL FIELD

Various techniques relate to implementing a persistent allocation on a wireless link and implementing a dedicated allocation on a wireless link.

BACKGROUND

In order to reduce control signaling overhead on a wireless link, techniques of persistent allocation of resources to a channel of the wireless link are known. Here, using a scheduling control message, resources re-occurring over time are reserved for communication on the channel. Upon a need of communicating on the channel, these re-occurring resources can be readily accessed by the transmitting device, i.e., without the need of using a further scheduling control message to implement a dedicated allocation for the respective data.

SUMMARY

A need exists for advanced techniques of allocating resources to channels of a wireless link.

This need is met by the features of the independent claims. The features of the dependent claims define embodiments A method of operating a device includes implementing a persistent allocation of a plurality of first resources to a first channel of a wireless link supported by an access node. The method also includes temporarily overriding the persistent allocation for a subset of the plurality of first resources. The method also includes, while overriding: implementing a dedicated allocation of a plurality of second resources to a second channel of the wireless link.

A computer program product or a computer program includes program code that is executable by at least one processor. Executing the program code causes the at least one processor to perform a method. The method includes implementing a persistent allocation of a plurality of first resources to a first channel of a wireless link supported by an access node. The method also includes temporarily overriding the persistent allocation for a subset of the plurality of first resources. The method also includes, while overriding: implementing a dedicated allocation of a plurality of second resources to a second channel of the wireless link.

A device is configured to implement a persistent allocation of a plurality of first resources to a first channel of a wireless link supported by an access node; and to temporarily override the persistent allocation for a subset of the plurality of first resources; and to implement a dedicated allocation of a plurality of second resources to a second channel of the wireless link, while overriding.

DETAILED DESCRIPTION OF EMBODIMENTS

Figure 1:
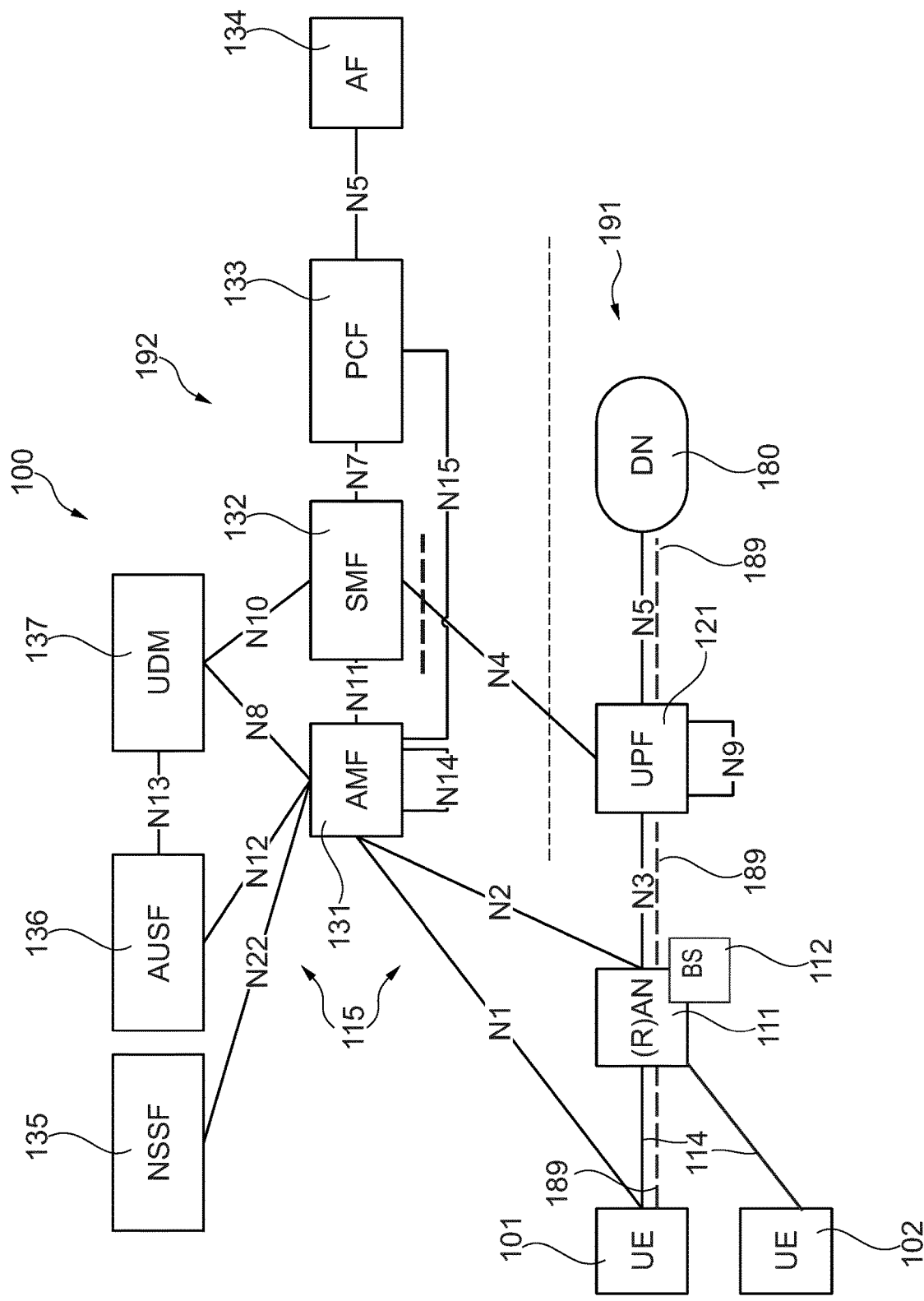
FIG. 1 schematically illustrates a communication network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wirelessly communicating using a communication network are described. The communication network may be a wireless network. For sake of simplicity, various scenarios are described hereinafter with respect to an implementation of the communication network by a cellular network. The cellular network includes multiple cells. Each cell corresponds to a respective sub-area of the overall coverage area. Other example implementations include Institute of Electrical and Electronics Engineers (IEEE) WiFi network, Multifire (see Qualcomm, "Multe-Fire: LTE-like performance with Wi-Fi-like deployment simplicity." https://www.qualcomm.com/invention/technologies/lte/multefire, 2016), etc.

Hereinafter, techniques of allocating resources to channels of a wireless link supported by an access node of the communication network are described.

A wireless link as used herein can enable communication between two or more nodes. A wireless link can enable communication using electromagnetic waves, e.g., in the MHz or GHz regime. A wireless link can support bi-directional communication. Modulation and coding of signals onto a carrier frequency can be used. A wireless link may include one or more channels. Channels may be associated with resources in the spectrum of the electromagnetic waves. Channels may be used to communicate signals and/or data of a specific kind. A wireless link can be supported by an access node of a network. For example, the access node can set certain properties of the wireless link, e.g., a timing, bandwidth etc.

Different channels of a wireless link may be between different nodes. For example, a wireless link supported by an access node may have a channel between the access node and a first terminal; and may have a further channel between access node and the second terminal. The wireless link may even have a still further channel between the first terminal and the second terminal—even for such sidelink communication the access node may set certain properties of the sidelink channel, e.g., timing, bandwidth, etc., so that also the sidelink channel of the wireless link is supported by the access node.

Implementing an allocation of resources to a channel may include refraining from communicating data on the resources which is associated with another channel. Hence, the resources may be reserved to belong to the channel. To this end, implementing an allocation of resources may include keeping track of the associations between the resources and the respective channel. Implementing an allocation can include transmission management to route data packets to the respective resources for sending and/or listening to the respective resources for receiving.

One or more scheduling control messages can be communicated to align the allocations at the transmitter and the receiver. Hence, both, the transmitting device, as well as the receiving device can implement the respective allocation.

The techniques described herein facilitate a coexistence of a persistent allocation and a dedicated allocation. Here, the persistent allocation can be associated with a plurality of resources that are re-occurring over time. The persistent allocation can be associated with a certain duration: For example, the persistent allocation can be associated with a time-out; until expiry of the time-out, the resources can be re-occurring. Such a scenario in which the persistent allocation is associated with a time-limited time duration is sometimes referred to as semi-persistent allocation. When communicating data on the channel for which the plurality of resources have been persistently allocated, it may not be required to communicate a scheduling control message which is dedicated to each specific instance of the data. Rather, resources of the plurality of resources of the persistent allocation may be readily accessed for communicating data which newly arrives in a transmit buffer, i.e., without the need of implementing a dedicated allocation upon receiving the data in a transmit buffer. In other words, a persistent allocation can be implemented without a-priori knowledge on the data that is to be communicated on the respective resources; while, in contrast, a dedicated allocation is typically implemented based on a-priori knowledge on the data that is to be communicated on the respective resources.

As a general rule, resources can be defined in at least one of frequency domain and time domain and code domain.

Resources may can be re-occurring over time if resources are repeated in accordance with a timing schedule. For example, the resources may be repeated periodically. For example, the resources may be occurring in every transmission frame or every n-th subframe, wherein n is an integer.

Frequency hopping can relate to a change of the frequency of the resources used for communicated from time to time. For example, frequency hopping can be applied for re-occurring resources of a persistent allocation. Here, the frequency can be changed from repetition to repetition or for every n-th repetition, according to a frequency hopping schedule. Resources may be defined within a resource grid of a carrier. Different resources may or may not be located in different resource grids of different carriers.

According to examples, a device implements a persistent allocation of a plurality of first resources to a first channel of a wireless link supported by an access node. Then, the device temporarily overrides the persistent allocation fora subset of the plurality of first resources and, while overriding, implements a dedicated allocation of a plurality of second resources to a second channel of the wireless link.

For example, the device may be an access node of a communication network, or a terminal (UE).

In other words, it is possible to free up capacity on the wireless link by said temporarily overriding; this capacity can then be used to accommodate for the second resources.

By such techniques it becomes possible to account for different traffic patterns associated with different channels. For example, a first traffic pattern of data that is communicated on the first channel can correspond to a steady data rate having a comparably small variability; differently, a second traffic pattern of data that is communicated on the second channel can correspond to a discontinuous data rate of large variability with pronounced peaks and dips (infrequent traffic pattern). By supporting the coexistence between the persistent allocation and the dedicated allocation, it becomes possible to tailor the balance between (i) limited-flexibility occupancy of the capacity of the wireless link associated with the persistent allocation; and (ii) increased control signaling overhead for scheduling of the dedicated allocation.

An example scenario in which such different traffic patterns are observed includes a payload channel for application data as a first channel for data associated with traffic of small variability of its data rate; and a control channel for control data as a second channel for control data associated with traffic of large variability of its data rate. This is explained in greater detail hereinafter.

For example, a wireless link typically operates within a given system bandwidth. Signaling on the wireless link may be divided into control signaling and payload signaling. For example, payload data associated with the payload signaling and communicated on a payload channel can be associated with an application layer, e.g., in accordance with then Open Systems Interface (OSI) transmission protocol stack. For example, the payload data may be defined on Layer 7 of an OSI transmission protocol stack. The control data associated with control signaling and communicated on a control channel can be associated with, e.g., Layer 1, Layer 2, or Layer 3 of an OSI transmission protocol stack. The control data can be for maintenance of the wireless link.

As a general rule, communication on the wireless link can be divided into broadcast signaling in which a transmitting device targets more than one receiving device; and one-to-one signaling where the transmitting device targets a dedicated receiving device. Both, payload data and control data can be associated with, both, broadcast signaling and one-to-one signaling.

Many wireless links implement frequency hopping for one or more channels. Frequency hopping corresponds to a change of the frequency for transmission, e.g., from transmission frame to transmission frame. For example, the frequency hopping may be imposed by channel access regulations—e.g., for an unlicensed band—, and/or for interference and fading mitigation—e.g., for unlicensed and licensed band operation. It has been observed that in reference implementations of a wireless link which implement frequency hopping for, both, control channels and data channels, allocating resources to the control channels significantly increases the control-signaling overhead. Thereby, the available capacity on the wireless link for the data channels is significantly reduced. For example, the capacity on the wireless link can be measured in terms of bits per Hz. This limits the throughput of payload data.

On the other hand, it has been found that certain control channels do not consume significant capacity and/or may be associated with an infrequent or non-periodic traffic pattern.

Then, by facilitating coexistence of the persistent allocation—e.g., for one or more payload channels—and the dedicated allocation—e.g., for one or more control channels—the overall throughput of data can be increased by reducing control-signaling overhead. By temporarily overriding the persistent allocation, on the other hand, capacity can be temporarily provided to accommodate resources of the dedicated allocation, to thereby support the infrequent traffic pattern associated with the traffic routed via the resources of the dedicated allocation.

Such techniques may be of particular relevance for a wireless link which employs frequency hopping, e.g., using a pseudo-random hopping pattern for one or more payload channels. Here, the dedicated allocation may be occasionally triggered in an event-driven fashion, e.g., using an event-driven signaling of control information that indicates the temporary override.

As a general rule, various types of channels are conceivable which include such an infrequent, non-periodic traffic pattern. Examples include a mobility control channel such as a paging control channel or a wake-up control channel or a control channel for data required in the preparation of handovers between cells of a cellular network, and a configuration control channel that indicates updates of operational parameters of the wireless link, e.g., updated system information.

In further detail, an example implementation of infrequent and non-periodic traffic includes wake-up signals (WUS). Such WUS techniques enable a UE to transition a main receiver of a UE into a low-power state, e.g., for power-saving purposes. In some examples, the low-power state of the main receiver may be an inactive state. For example, the WUS may be received by a dedicated low-power receiver of the UE. In other examples, the WUS may be received by the main receiver in the low-power state. Here, it may not be required to provision a dedicated low-power receiver. The low-power receiver and main receiver may be implemented within the same hardware component(s) or may be implemented by at least one different hardware component. The inactive state can be characterized by a significantly reduced power consumption if compared to an active state of the main receiver. For example, the main receiver may be unfit to receive any data in the inactive state such that some or all components may be shut down. Wake-up of the main receiver from the inactive state is then triggered by a WUS.

As a general rule, the inactive state can be associated with various operational modes of the UE, e.g., a disconnected mode or idle mode; but in some scenarios also a connected mode. Sometimes, the operational mode of the UE associated with WUS communication is referred to as WUS mode. As a general rule, there may be multiple WUS modes available, e.g., modes in which the UE is registered at the network as connected or idle, etc. When operating in a WUS mode, such UE's may only listen for a specific WUS—and may not be listening for transmitting on further channels that are active on the wireless link. In such a scenario it is conceivable that there is no persistent allocation for a wake up control channel having predefined re-occurring resources; rather, a dedicated allocation may be used for the wake up control channel. Other UE's not operating in inactive mode may not listen to the resources of the dedicated allocation to the wake up control channel.

On the other hand, an example implementation of a control channel associated with a periodic traffic pattern includes a synchronization control channel and a reference-signal control channel. Synchronization signals may be broadcasted on the synchronization control channel to provide for repeated acquiring of synchronization between UEs and the access node supporting the wireless link. A common timing reference may be provided for. To avoid for drifts and loss of synchronization, these synchronization signals are typically periodically repeated such that a persistent allocation of resources to the synchronization control channel is feasible. Further, similar considerations apply to reference signals used for channel sounding. Typically, a plurality of UEs operating in a cell may be listening for the synchronization control channel and the reference-signal control channel.

FIG. 1 schematically illustrates a cellular network 100. The example of FIG. 1 illustrates the network 100 according to the 3GPP 5G architecture. Details of the fundamental architecture are described in 3GPP TS 23.501, version 1.3.0 (2017-09). While FIG. 1 and further parts of the following description illustrate techniques in the 3GPP 5G framework, similar techniques may be readily applied to different communication protocols. Examples include 3GPP LTE 4G and IEEE Wi-Fi technology.

In the scenario of FIG. 1, a UE 101 is connectable to the network 100. For example, the UE 101 may be one of the following: a cellular phone; a smart phone; an IOT device; an MTC device; a sensor; an actuator; etc.

The UE 101 is connectable to the network 100 via a radio access network (RAN) 111, typically formed by one or more BSs (not illustrated in FIG. 1). A wireless link 114 is established between the RAN 111—specifically between one or more of the base stations (BSs) 112 of the RAN 111—and the UE 101. The wireless link 114 supports communication by implementing a multi-layer transmission protocol stack, defining the ruleset required to align the communication between participating devices 111, 112.

FIG. 1 also illustrates a further UE 102. The further UE 102 is also connected to the network 100 via the wireless link 114 (a respective data connection is not illustrated in FIG. 1 for sake of simplicity). For example, the wireless link 114 may support multiple channels that include resources for communication of signal(s) and/or data between the BS 112 and each one of the UEs 101, 102, respectively. For example, the communication between the BS 112 and both of the UEs 101, 102 may be in accordance with a common timing reference provided by the BS 112; therefore, the UEs 101, 102 share the same wireless link 114. For example, a frequency reference of the wireless link 114 may be applicable to communication between the BS 112 and both UEs 101, 102. In general, the BS 112 may set the framework of communication on the wireless link 114 such that coexistence of multiple UEs 101, 102 is facilitated for shared access to the wireless link 114.

In the various examples described herein, the wireless link 114 may be implemented on an unlicensed spectrum. Multiple operators or networks may share access to the unlicensed spectrum. In other words, access to the unlicensed spectrum may not be restricted to a single operator or network. Typically, the wireless communication on the unlicensed spectrum may involve procedures and limitations due to the possibility of multiple networks sharing the same spectrum. Such techniques are sometimes also referred to as clear channel assessment techniques, e.g. Carrier Sense Multiple Access/Collision Avoidance (CSMA/CA). Other techniques to ensure that multiple networks can share the same spectrum may include channel access regulations. Such channel access regulations may include, but are not limited to limitations on maximum percentage of transmissions per time unit (maximum channel access duty cycle), limitations on maximum transmission output power, and limitations on the maximum channel occupancy time per transmission. The required techniques may differ depending on channel access regulations for the unlicensed spectrum, and the requirements may be different depending on the specific frequency spectrum as well as the geographic location of the device. This is captured by the specific channel access regulations.

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data network 180, e.g., the Internet or a Local Area Network. Application data can be communicated between the UE 101 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: registration management; non-access stratum (NAS) termination; connection management; reachability management; mobility management; access authentication; and access authorization the AMF 131 can negotiate an NAS-level security context with the UE 101. See 3GPP TS 23.501 version 1.3.0 (2017-09), section 6.2.1. For example, the AMF 131 controls CN-initiated wake-up and/or paging of the UEs 101: The AMF 131 may trigger transmission of WUS and/or paging signals of the UE 101. The AMF 131 may keep track of the timing of a DRX cycle of the UE 101.

A data connection 189 is established by the AMF 131 if the respective UE 101 operates in a connected mode. To keep track of the current mode of the UEs 101, the AMF 131 sets the UE 101 to evolved packet system (EPS) connection management (ECM) connected or ECM idle. During ECM connected, a NAS connection is maintained between the UE 101 and the AMF 131. The NAS connection implements an example of a mobility control connection. The NAS connection may be set up in response to wake-up and/or paging of the UE 101, using a random access (RA) transmission.

The data connection 189 is established between the UE 101 via the RAN 111 and the DP 191 of the CN 115 and towards the DN 180. For example, a connection with the Internet or another packet data network can be established. A server of the DN 180 may host a service for which payload data is communicated via the data connection 189. The data connection 189 may include one or more bearers such as a dedicated bearer or a default bearer. The data connection 189 may be defined on the Radio Resource Control (RRC) layer, e.g., generally Layer 3 of the OSI model of Layer 2.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

As such, the AMF 131 and the SMF 132 both implement CP mobility management needed to support a moving UE.

Figure 2:
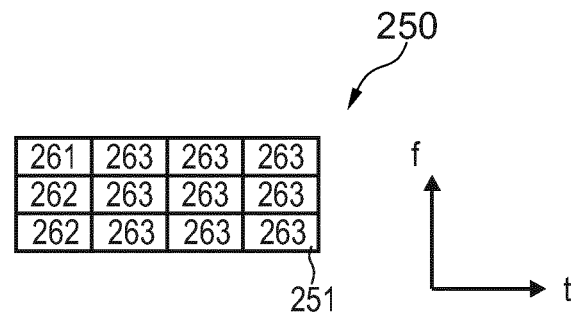
FIG. 2 schematically illustrates resources allocated to various channels of a wireless link supported by an access node of the communication network according to various examples.

FIG. 2 illustrates aspects with respect to channels 261-263 implemented on the wireless link 114. The wireless link 114 implements a plurality of communication channels 261-263.

Resources—defined in time and frequency—can be allocated to the channels 261-263. A scheduling control message can be used to align the time-frequency position of the allocated resources between transmitter and receiver. For example, the scheduling control message may be a Layer 3 control message.

To avoid collision between communication on the various channels 261-263, the resources can be exclusively allocated; hence resource allocation to different channels 261-263 can be orthogonal with respect to each other. This may correspond to time division duplex (TDD) and frequency division duplex (FDD).

As a general rule, it is possible to defined, for each channel 261-263 individually, whether frequency hopping is to be used, i.e., whether to switch the resources allocated to the channel 261-263 over time.

As a general rule, it is possible that different resources are supported by a common carrier—e.g., by using a time-frequency resource grid defined by subcarriers and symbols in frequency and time domain, respectively. It would also be possible that different resources are supported by different carriers. For example, a narrowband carrier may be used for communication of WUSs; while a broadband carrier may be used for communication of payload data.

For example, a first channel 261 may carry reference signals, e.g., channel sounding reference signals and/or synchronization signals for acquiring the timing and frequency reference.

A second channel 262 may carry WUS which enable the network 100—e.g., the AMF 131 (or a MME in the 3GPP LTE framework)—to wake-up the UE 101. The second channel 262 may thus implement a wake-up control channel. The WUSs may thus be communicated in dedicated resources of the second channel 262. Alternatively, the second channel 262 may carry paging signals, i.e., implement a paging control channel. Generally, the second channel 262 may implement a mobility control channel, e.g., for coordinating handovers between multiple cells of the network, etc.

Further, a third channel 263 is associated with a payload signal encoding payload data. For example, payload messages carrying higher-layer user-plane data packets associated with a given service implemented by the UE 101 and the BS can be communicated on a payload channel, such as the third channel 263. User-data messages may be transmitted via the payload channel 263. Alternatively, Layer 3 or RRC control messages may be transmitted via the payload third channel 263, e.g., a paging message. Also, scheduling control messages—e.g., DL control information (DCI)—can be communicated via the payload third channel 263.

Figure 3:
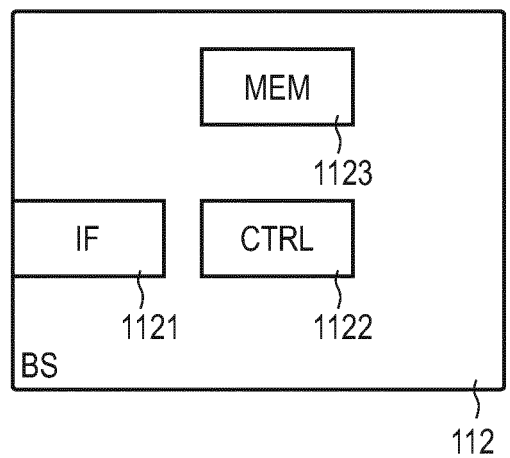
FIG. 3 schematically illustrates a base station implementing the access node of the communication network according to various examples.

FIG. 3 schematically illustrates a BS 112 of the RAN 111 (cf. FIG. 1). The BS 112 includes an interface 1121. For example, the interface 1121 may include an analog front end and a digital front end. The BS 112 further includes control circuitry 1122, e.g., implemented by means of one or more processors and software. For example, program code to be executed by the control circuitry 1122 may be stored in a non-volatile memory 1123. In the various examples disclosed herein, various functionality may be implemented by the control circuitry 1122, e.g.: implementing a persistent allocation; implementing a dedicated allocation; overriding the persistent allocation; etc.

Figure 4:
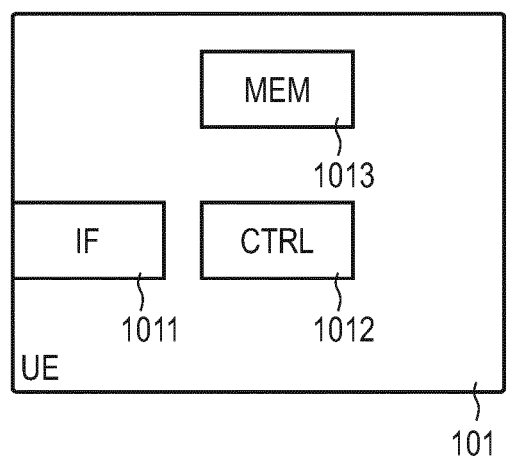
FIG. 4 schematically illustrates a terminal according to various examples.

FIG. 4 schematically illustrates the UE 101. The UE 101 includes an interface 1011. For example, the interface 1011 may include an analog front end and a digital front end. In some examples, the interface 1011 may include a main receiver and a low-power receiver. Each one of the main receiver and the low-power receiver may include an analog front end and a digital front end, respectively. The UE 101 further includes control circuitry 1012, e.g., implemented by means of one or more processors and software. The control circuitry 1012 may also be at least partly implemented in hardware. For example, program code to be executed by the control circuitry 1012 may be stored in a non-volatile memory 1013. In the various examples disclosed herein, various functionality may be implemented by the control circuitry 1012, e.g.: implementing a persistent allocation; implementing a dedicated allocation; overriding the persistent allocation; etc.

Figure 5:
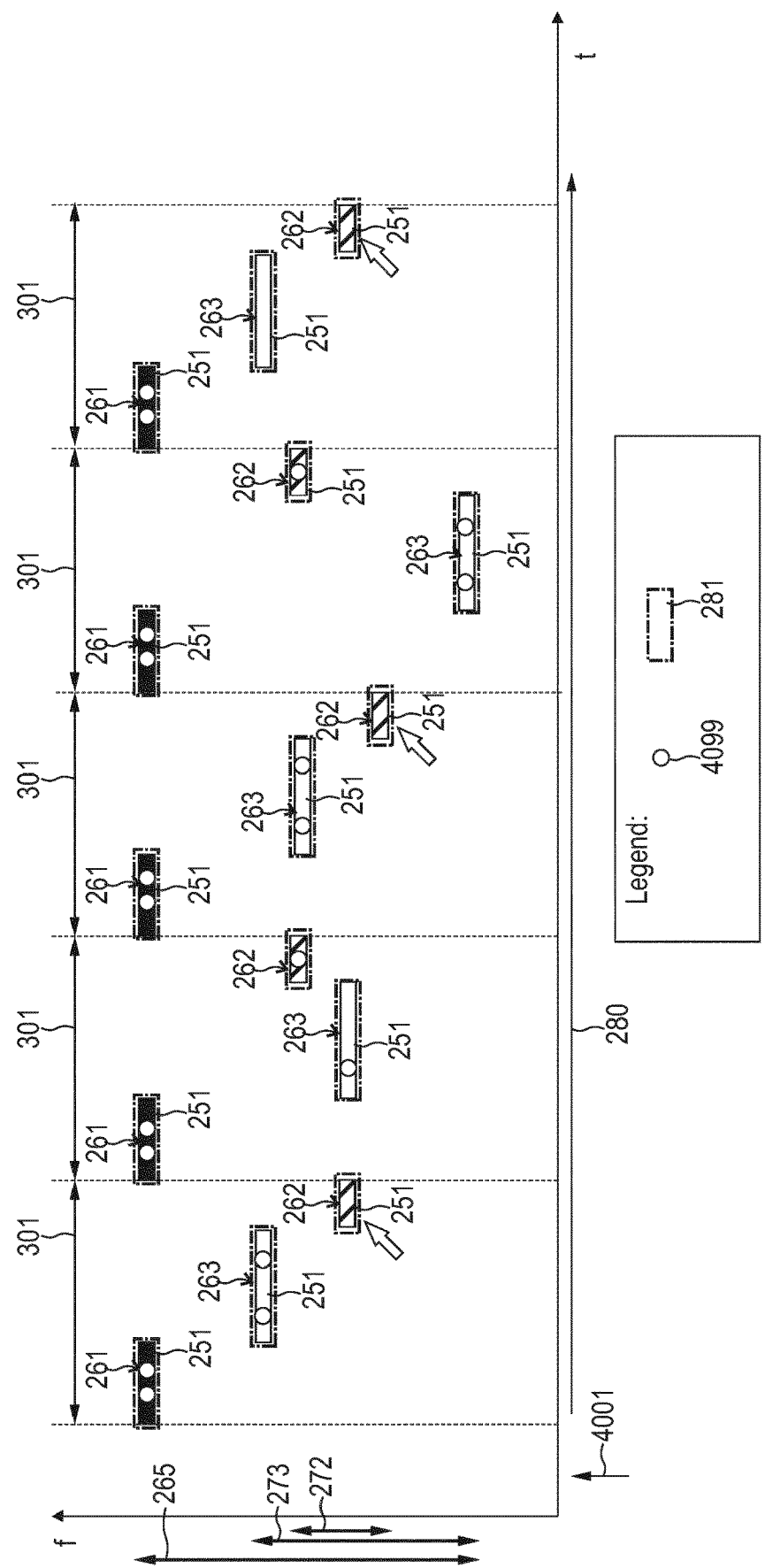
FIG. 5 schematically illustrates resources of a persistent allocation in time domain and frequency domain according to a reference implementation.

FIG. 5 schematically illustrates aspects with respect to persistent allocations of resources 251 to multiple channels 261-263. Specifically, FIG. 5 illustrates the resources 251 in time and frequency domain. As illustrated in FIG. 5, the resources 251 are spread out across a frequency band 265. For example, the resources 251 associated with different channels 261-263 may be defined in a time-frequency resource grid 250 of one or more carriers.

As will be appreciated from FIG. 5, the resources 251 allocated to the channels 261-263 do not fully occupy the spectrum within the frequency band 265, but only occupy a certain sub-fraction of the spectrum. This can be due to channel access regulations—e.g., if the frequency band 265 resides on an unlicensed band. This can limit the maximum amount of resources 251 per time.

FIG. 5 also illustrates aspects with respect to scheduling the persistent allocations 281 of the resources 251 using a scheduling control message 4001. The scheduling control message 4001—typically a downlink (DL) control message transmitted by the BS 112 and received by the UE 101—facilitates the implementation of the persistent allocations 281 of the resources 251 to the channels 261-263 at, both, the UE 101, as well as at the BS 112. Specifically, the allocated resources 251 are re-occurring over time for an extended time duration 280, in the example of FIG. 5 with a periodicity that corresponds to the duration of transmission frames 301 of the transmission protocol stack implemented on the wireless link 114.

Figure 6:
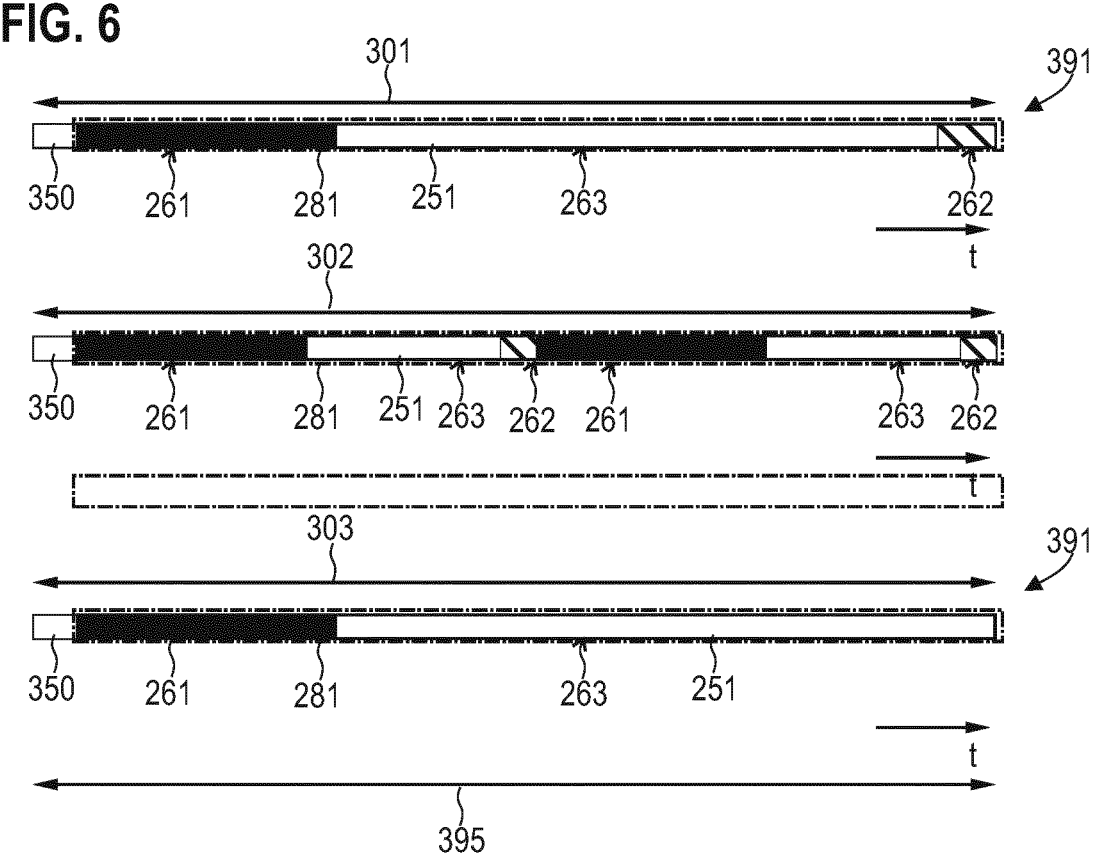
FIG. 6 schematically illustrates different types of transmission frames having different frame structures according to various examples.

FIG. 6 illustrates aspects with respect to a frame structure 391 of the transmission frames 301. FIG. 6 illustrates the frame structure 391 of the transmission frames 301. The frame structure 391 can be generally characterized by various modalities.

As an example modality, the frame structure 391 defines a partition between resources 251 allocated to the various channels 261-263. As illustrated for a further example of a transmission frame 302 and a transmission frame 303, the frame structure 391 can be varied by varying the partition—e.g., in terms of distribution of resources allocated to the channels 261-263 and, more generally, by an amount of resources per transmission frame 301-303 allocated to the various channels 261-263 (in FIG. 6, the amount of resources allocated to the second channel 262 is zero for the transmission frame 303, but non-zero for the transmission frames 301, 302).

The frame structure 391, as an example modality, also defines the use of a header 350 of the transmission frame 301, 302, 303 (the header 350 omitted for sake of simplicity in FIG. 5). For example, the header 350 can include an indicator indicative of the frame structure 391. Typically, the header 350 include Layer 1 control information, i.e., short and low-level control information. As example, the header may include information related to selection of modulation and coding for the frame transmission. Further it may include information indicative of the type of information in the frame, e.g. hybrid ARQ information indicating whether the payload in a frame is a first transmission or a re-transmission. Further the header may include scheduling information such as control information indicative of the uplink versus downlink allocation of the frame.

The frame structure 391, as a further example modality, also defines a duration 395 of the transmission frame 301, 302, 303.

As a general rule, depending on the particular scenario, the frame structure 391 may define only a subset of these modalities and/or further modalities.

Again referring to FIG. 5: By using the persistent allocation 281, it is possible to communicate signal(s) and/or data 4099 during an extended time duration 280 without the need of re-sending the scheduling control message 4001 each time the signal(s) and/or data 4099 arrive in a transmit buffer. Specifically, in FIG. 5, the access of the resources 251 for the communication of signal(s) and/or data 4099 on the channels 261 is also illustrated. As will be appreciated from FIG. 5, signal(s) and/or data 4099 are communicated on the channel 261 having a traffic pattern with low variability; this also applies, to some extent, to the third channel 263. Differently, the traffic pattern of the signal(s) and/or data 4099 communicated on the second channel 262 exhibits a significant variability. There is no periodicity associated with the occurrence of signal(s) and/or data 4099 to be communicated on the second channel 262. The reference implementation of FIG. 5—which uses a persistent allocation 281 for the second channel 262—results in an unused overhead of the resources 251 persistently allocated to the second channel 262. In the reference implementation of FIG. 5, a significant part of the resources 251 persistently allocated to the second channel 262 remains un-used (cf. arrows in FIG. 5). Due to the static character of the persistent allocation 281 in the reference implementation of FIG. 5, it is not easily possible to avoid such a waste of the resources 251 allocated to the second channel 262.

Hereinafter, techniques are described which facilitate mitigation of such a waste of resources 251, by facilitating a flexible coexistence of persistent and dedicated allocations. This helps to mitigate the disadvantages of the reference implementation as illustrated in FIG. 5 which exclusively employs a persistent allocation 281.

To achieve this, it is possible to temporarily override the persistent allocation 281; then, while overriding, it is possible to temporarily implement a dedicated allocation.

As a general rule, there are various options available for overriding the persistent allocation 281. An example variant is illustrated in connection with FIG. 7. This option includes adjustment of the frame structure when overriding.

Figure 7:
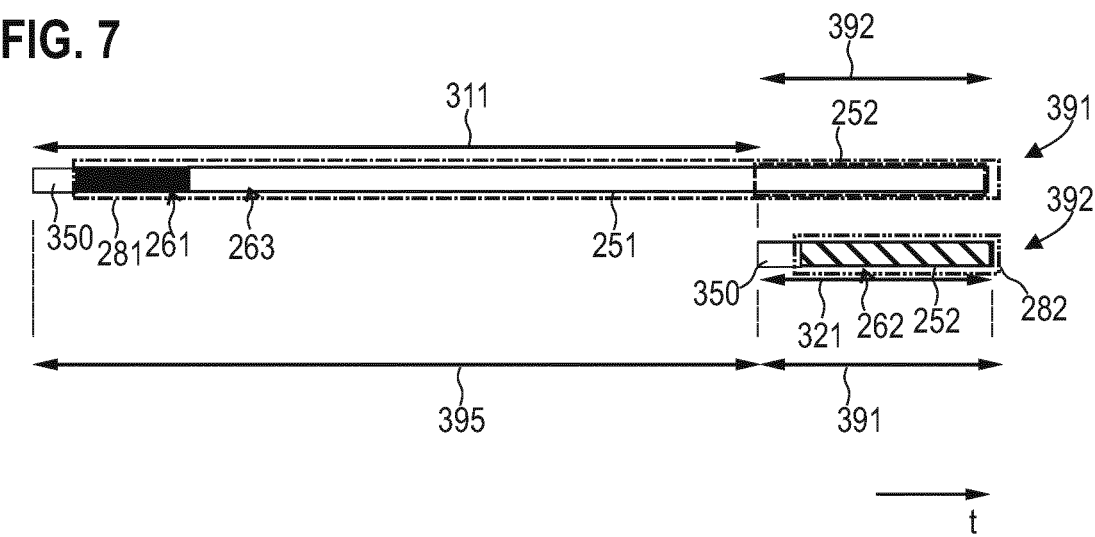
FIG. 7 schematically illustrates different types of transmission frames having different frame structures according to various examples.

FIG. 7 illustrates aspects with respect to the frame structure 391, 392 of transmission frames 311, 321.

The transmission frame 311 is associated with a persistent allocation 281 of resources 251. As such, the transmission frame 311 includes resources 251 that are persistently allocated to the channels 261, 262. The transmission frame 311 does not include any resources 251 allocated to the third channel 263.

The transmission frame 321 is associated with a dedicated allocation 282 of resources 252. As such, the transmission frame 321 includes resources 252 that are dedicatedly allocated to the second channel 262. The transmission frame 321 does not include any resources allocated to the channels 261, 263.

As illustrated in FIG. 7, the persistent allocation 281 extends beyond the length 395 of the transmission frame 311. The persistent allocation 281 is natively associated with the transmission frame 301 of FIG. 6 which has a longer length 395: The persistent allocation 281 may be expected for the transmission frame 301 by the receiver.

To facilitate the coexistence of persistent and dedicated allocations 281, 282, the persistent allocation 281 can be temporarily overridden for a subset 251A of resources 251. This is achieved by replacing the transmission frame 303 by using the transmission frame 311: the transmission frame 311 has a frame structure 391 that generally corresponds to the frame structure 391 of the transmission frame 303, but with a shortened length 395—i.e., the transmission frame 311 is shortened if compared to the transmission frame 303. By using the shorter length 395 of the transmission frame 311, the subset 251A is cropped from the resources 251 of the persistent allocation 281. The resources 252 of the dedicated allocation 282 are time-aligned with the transmission gap 392 created by the subset 251A of resources 251. Specifically, the transmission frame 321 can be inserted into the transmission gap 392 created by cropping the subset 251A of resources 251. Hence, the resources 252 of the dedicated allocation 282 are time-aligned (see vertical dashed lines in FIG. 7) with the cropped subset 251A and the corresponding transmission gap 392.

The inserted transmission frame 321 including the resources 252 of the dedicated allocation 282 has a frame structure 392 which differs from the frame structure 391 of, both, the transmission frame 303, as well as the transmission frame 311 including the resources 251 of the persistent allocation 281. Specifically, in the illustrated non-limiting example the frame structure 391 differs for the transmission frames 321 versus 303, 311 with respect to the following modalities: length 395; and amount of resources 251, 252 allocated to the various channels 261-263. In other examples, other modalities may differ or only some of the above-identified modalities—length and amount of resources 251, 252—may differ.

In the illustrated example, the length 395 of the transmission frame 321 including the resources 252 of the dedicated allocation 282 is shorter if compared to the length 395 of the transmission frames 303, 311 including the resources 251 of the persistent allocation 281. In other examples, the length 395 of a transmission frame including resources 252 of the dedicated allocation 282 may be longer if compared to the length 395 of a transmission frames including the resources 251 of the persistent allocation 281.

Further, in the illustrated example, the transmission frames 303, 311 have a non-zero amount of resources 251 allocated to the channels 261, 263; but have a zero amount of resources 251 allocated to the second channel 262. Differently, the transmission frame 321 has a zero amount of resources 252 allocated to the channels 261, 263; and has a non-zero amount of resources 252 allocated to the second channel 262. As a general rule, beyond such strict separation of resources 251, 252 of the various channels 261-263 in accordance with the persistent and dedicated allocation 281, 282, also mixed scenarios are conceivable in which resources 251 of the persistent allocation 281 are predominantly included in transmission frames having a first frame structure 391—while resources 252 of the dedicated allocation 282 are predominantly assigned to transmission frames having a second frame structure 392. Hence, the amount of resources 251 of the persistent allocation 281 can be larger for the transmission frames of the first frame structure 391 if compared to the transmission frames of the second frame structure 3920.

Figure 8:
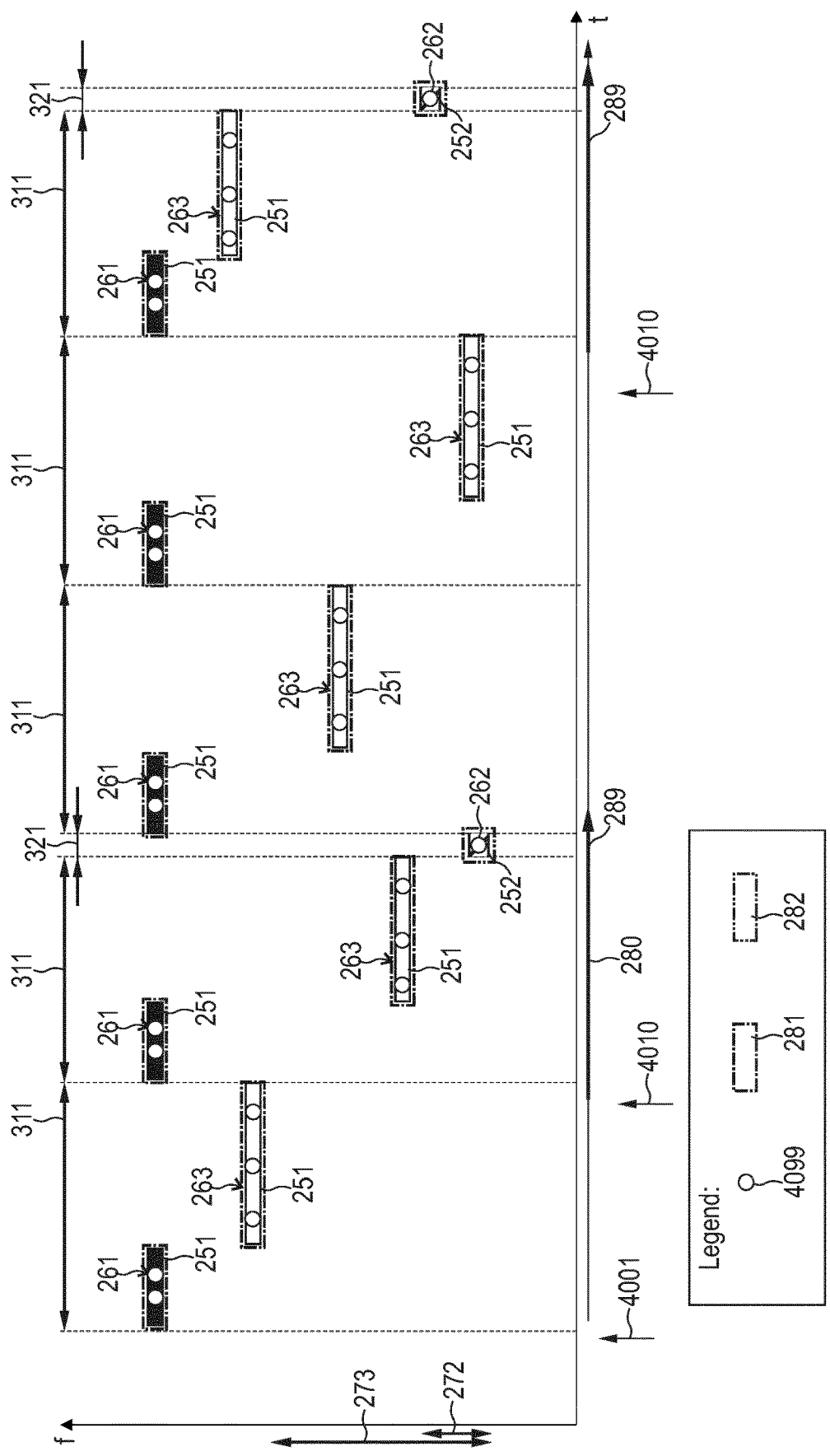
FIG. 8 schematically illustrates resources of a persistent allocation and resources of a dedicated allocation in time domain and frequency domain according to various examples.

FIG. 8 schematically illustrates aspects with respect to persistent allocations of resources 251, 252 to multiple channels 261-263. Specifically, FIG. 8 illustrates the resources 251, 252 in time and frequency domain.

FIG. 8 corresponds to an implementation of overriding the persistent allocation 281 by inserting the short transmission frames 321 into a sequence of transmission frames 303, 311 including the resources 251 of the persistent allocation 281. The transmission frames 321 include resources 252 of the dedicated allocation 282.

FIG. 8 also illustrates aspects with respect to signaling the override of the persistent allocation 281. In the example of FIG. 8, said overriding of the persistent allocation 281 is signaled override control information 4010. For example, said overriding can be signaled using override control information 4010 communicated using a DL control channel of the wireless link 114; and/or a transmission frame header 350. It would be conceivable that an indicator indicative of said overriding is included in the transmission frame header 350 of the transmission frames 311 that have the shortened length if compared to the transmission frames 303. For example, for each transmission frame 303, 311, 321, an indicator indicative of a codebook index of the respective transmission frame structure 391, 392 or, generally, frame type, could be signaled; by switching the transmission frame structure 391, 392, the overriding can be implicitly signaled. In another examples, for each transmission frame 303, 311, the particular length 395 can be signaled.

In particular in a scenario in which the override control information 4010 is not part of the frame header 350, the override control information 4010 can also be transmitted separately from the particular transmission frame affected by the overriding.

As a general rule, the override control information 4010 indicative of said overriding can be native to a lower layer of the transmission protocol stack implemented by the wireless link 114 if compared to the scheduling control information 4001. For example, the scheduling control information 4001 can be native to Layer 3; while the override control information 4010 can be native to Layer 1—e.g., by including the override control information 4010 as an indicator in the transmission frame header 350. Thereby, low-latency override with limited control signaling becomes possible.

As a general rule, the override control information 4010 can be indicative of a duration 289 of said overriding. The override control information 4010 can be explicitly or implicitly indicative of the duration 289. As an example, considering that the override control information 4010 is included in a header 350 of a transmission frame 311: this can implicitly indicate a duration 289 which corresponds to the length 395 of that transmission frame 311. The next transmission frame 303, 311 including resources 251 of the persistent allocation 281 may not be covered by the corresponding override control information 4010; but may be covered by further override control information 4010 included in the header of the next transmission frame 303, 311. In other examples, the override control information can be indicative of the duration 289 in more explicit terms. For example, the override control information could include an indicator indicative of the duration in terms of milliseconds or a number of sequence numbers of affected transmission frames 303, 311, 321.

The signaling of the override control information 4010 can be event driven. For example, the event can include arrival of signal(s) and/or data 4099 for communication on the second channel 262 in a transmit buffer. Then, the overriding may be event driven, in response to the need of communicating on the second channel 262.

FIG. 8 also illustrates aspects with respect to frequency hopping. As will be appreciated from FIG. 8, the frequency hopping pattern—i.e., the time-series of used frequencies—differs between the persistent allocation 281 and the dedicated allocation 282. Specifically, the resources 252 of the dedicated allocation 282 are time-aligned with the subset 251A of cropped resources 251; but use different frequencies, because of the different frequency hopping patterns.

As will be appreciated in FIG. 8, the (i) override control information 4010 and (ii) the signal(s) and/or data communicated on the second channel 262 may be at different frequencies and offset in frequency domain—e.g., depending on the frequency hopping pattern used for the resources 252 of the dedicated allocation 282.

Such a technique helps to avoid a correlation between the timing of the subset 251A on the one side, and the frequencies used for communicating on the resources 251 of the dedicated allocation 282 on the other side.

A UE 101 intending to receive on resources 252 of the second channel 262 for which resources 252 are allocated by the dedicated allocation 282 may typically not listen for the resources 251 of the persistent allocation 281 and may therefore need advanced logic to detect or to calculate which frequency the second channel 262 will be allocated to. In some examples, it would even be possible that the dedicated allocation 282 does not use frequency hopping, but rather a fixed frequency for its resources, different to the persistent allocation 281, to avoid such issues. Alternatively, a limited hopping range/simplified hopping pattern can help to simplify the logic required to detect the frequency of the resources 252 of the dedicated allocation 282 by the UE 101: As illustrated, the frequency hopping range 273 of the resources 251 allocated to the third channel 263 by the persistent allocation 281 may be smaller than the frequency hopping range 271 of the resources 252 allocated to the second channel 262 by the dedicated allocation 282. As a general rule, the frequency hopping range 273 can be limited to 2-5 frequencies for the resources 252 of the dedicated allocation 282.

Figure 9:
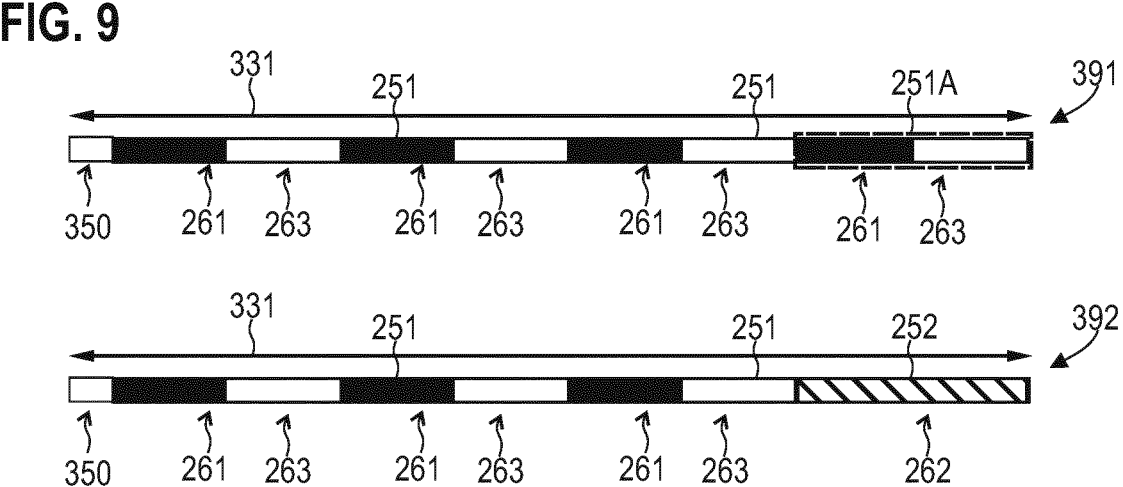
FIG. 9 schematically illustrates redistributing a subset of resources included in the transmission frame from a persistent allocation to a dedicated allocation according to various examples.

FIG. 9 illustrates aspects with respect to the frame structures 391, 392 of a transmission frame 331. In the example of FIG. 9, the overriding is implemented within the transmission frame 331. In the example of FIG. 9, communication of signal(s) and/or data in the subset 251A is selectively blocked for the channels 261, 263 (upper part of FIG. 9 illustrates blocking not being active, while lower part of FIG. 9 illustrates blocking being active). Then, these resources 251 of the subset 251A can be temporarily allocated to the channel 262; hence, the implement the resources 252 of the dedicated allocation 282. This corresponds to temporarily redistributing the resources 251 of the subset 251A from the persistent allocation 281 to the dedicated allocation 282, thereby implementing the resources 252. Thus, the frame structure 392 is obtained.

Specifically in such a scenario of FIG. 9—in which the transmission frame 331 is not switched—it is possible to implement the override control information 4010 in an implicit manner. For example DCI for communicating on the resources 251 allocated to the channels 261, 263 included in the subset 251A may be omitted—thus, the DCI is not transmitted, but generally expected, this can correspond to an indication of the temporary redistribution of the respective resources 251 in the subset 251A from the persistent allocation 281 to the resources 252 of the dedicated allocation 282. The DCI can thus be blocked from being transmitted.

Figure 10:
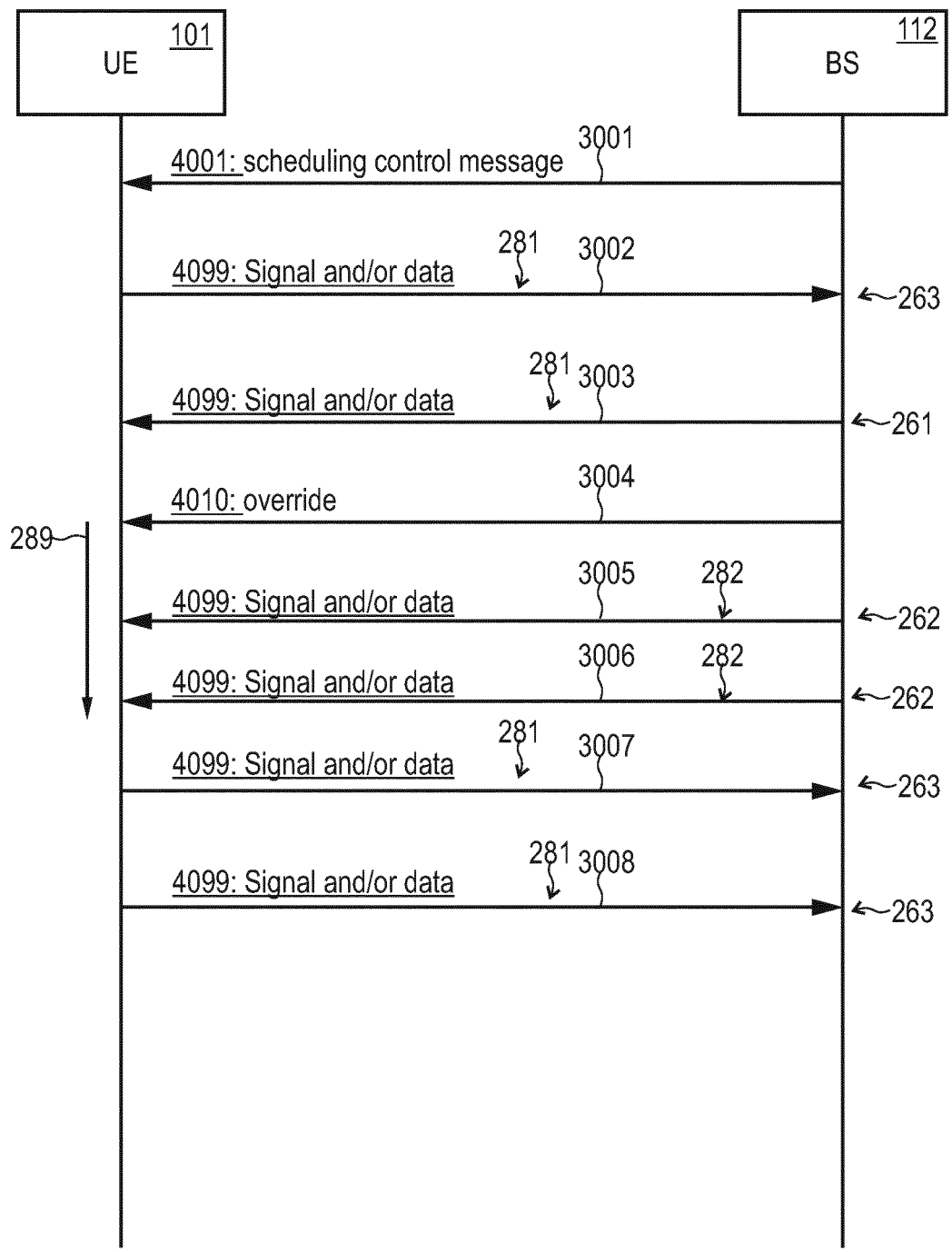
FIG. 10 is a signaling diagram according to various examples.

FIG. 10 is a signaling diagram of various examples. Initially, at 3001, a scheduling control message 4001 is transmitted by the BS 112 and received by the UE 101. The scheduling control message 4001 is indicative of the persistent allocation 281.

Optionally, the scheduling control message 4001 can also be indicative of the dedicated allocation 282. For example, the scheduling control message 4001 could be indicative of certain properties of the dedicated allocation 281, e.g., the frequency hopping pattern including the frequency range 272, and/or a rule set with respect to the timing of said overriding, e.g., specifying a timing relationship between communicating the overriding control information 4010, the activation of said overriding, and the time duration 289 of said overriding.

The scheduling control message 4001 may directly activate the persistent allocation 281; differently, the scheduling control message 4001 may not directly activate the dedicated allocation 282. Rather, the scheduling control message 4001 may set a general framework of the dedicated allocation, while activation of the dedicated allocation 282 is handled by the override control information 4010.

The scheduling control message 4001 may be a Layer 3 RRC control message.

As a general rule, more than a single scheduling control messages 4001 may be communicated, e.g., at least one for the persistent allocation 281 and at least one for the dedicated allocation 282.

Next, at 3002, signal(s) and/or data 4099 of the third channel 263 are communicated using the resources 251 of the persistent allocation 281, i.e., the persistent allocation 281 is implemented at each one of the UE 101 and the BS 112. At 3003, further signal(s) and/or data 4099 of the channel 261 are communicated using the resources 251 of the persistent allocation 281, i.e., the persistent allocation 281 is implemented at each one of the UE 101 and the BS 112. As a general rule, it is possible that the channels 261, 263 for which resources are allocated by the persistent allocation 281 include at least one of DL channels and uplink (UL) channels (cf. FIG. 9: 3002—UL; and 3003—DL).

Next, using the override control information 4010, at 3004, the persistent allocation is overridden for a time duration 289 and, while overriding, the dedicated allocation 282 is implemented: specifically, in the scenario of FIG. 9, DL signal(s) and/or data 4099 are transmitted by the BS 112 and received by the UE 101 on the resources 2521 of the dedicated allocation 282. Then, overriding completes; and, at 3007, 3008, again, signal(s) and/or data 4099 are communicated on the resources 251 of the persistent allocation 281.

As will be appreciated from FIG. 10, generally, it would be possible that the directivity of the channels 261, 263 for which resources are allocated by the persistent allocation 281 and the dedicated allocation 282, respectively, is the same or different. For example, both, the persistent allocation 281, as well as the dedicated allocation 282 could allocate UL resources 252 or DL resources 252; other scenarios, it would be possible that the persistent allocation 281 includes DL resources 251 and the dedicated allocation 282 includes UL resources, or vice versa.

Figure 11:
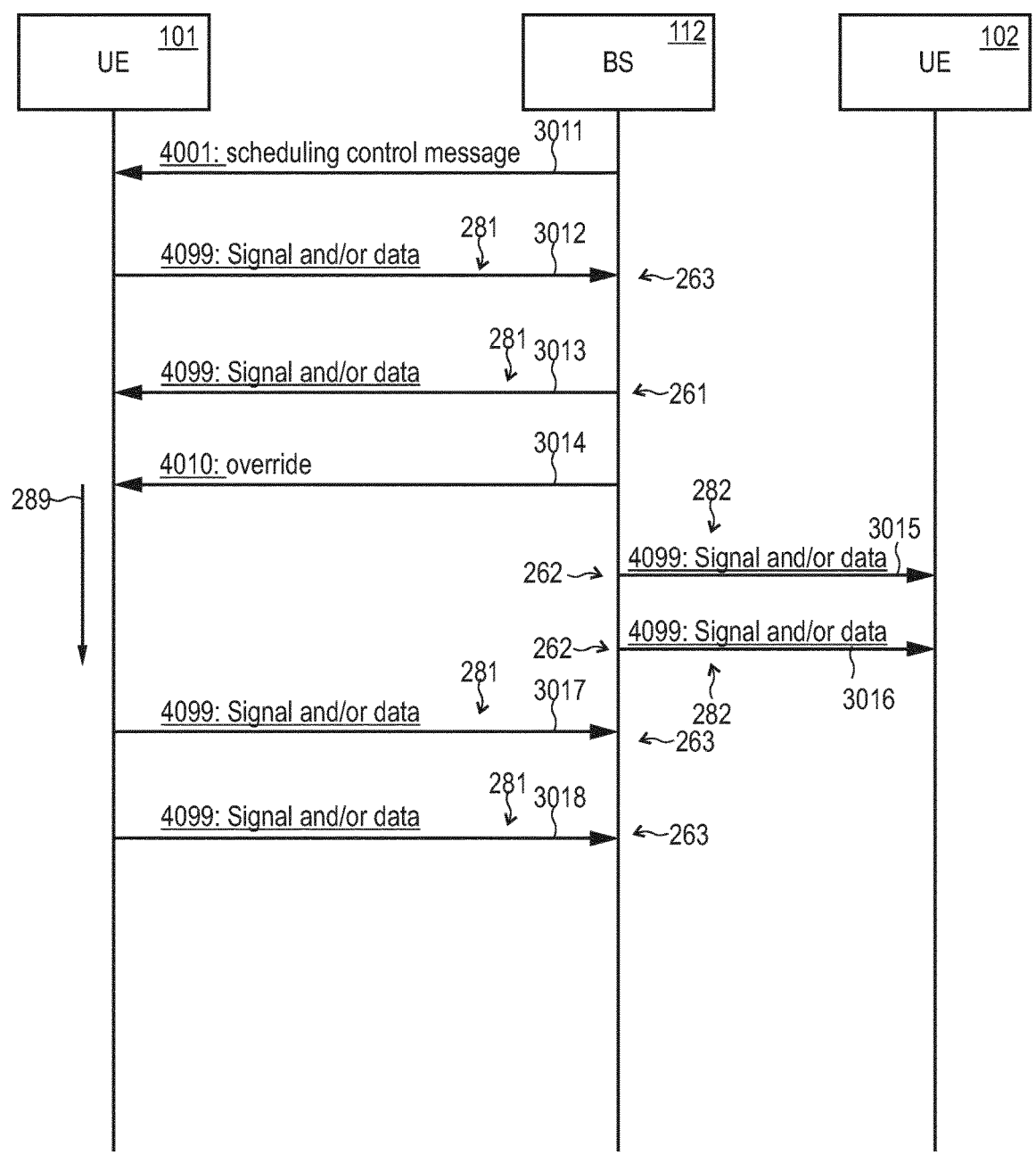
FIG. 11 is a signaling diagram according to various examples.

FIG. 11 is a signaling diagram. The example of FIG. 11 generally corresponds to the example of FIG. 10. Specifically, 3011 corresponds to 3001; 3012 corresponds to 3002; 3013 corresponds to 3003; 3014 corresponds to 3004; 3017 corresponds to 3007; and 3018 corresponds to 3008.

In the example of FIG. 11, the second channel 262 for which resources are allocated using the dedicated allocation 282 is between different end nodes than the first and third channels 261, 263 for which resources of the persistent allocation 281 are used. Specifically, the second channel 262 is between the BS 112 and a second UE 102.

Figure 12:
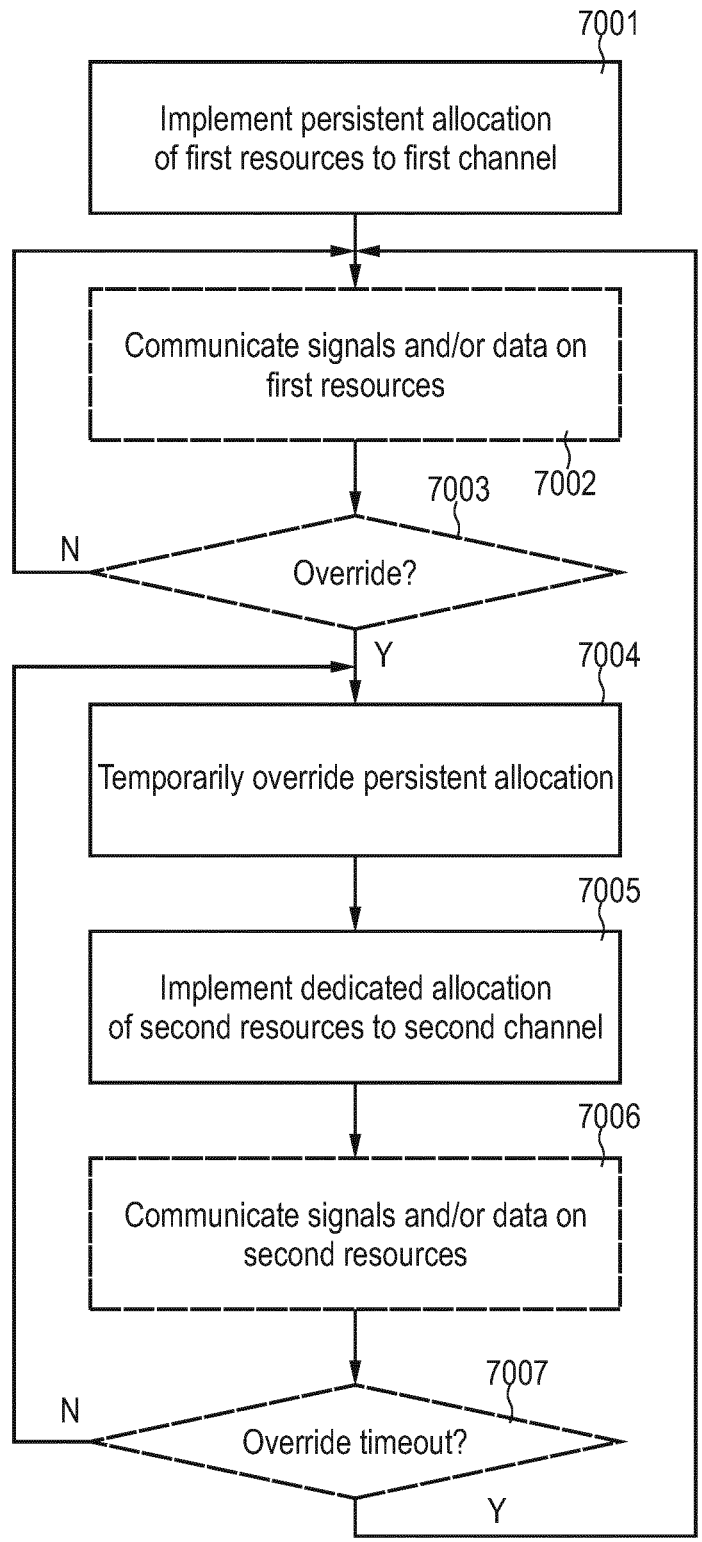
FIG. 12 is a flowchart of a method according to various examples.

FIG. 12 is a flowchart of a method according to various examples. For example, the method of FIG. 12 could be executed by the control circuitry 1122, 1123 of the BS 112. Alternatively or additionally, the method of FIG. 12 could be executed by the control circuitry 1012, 1013 of the UE 101 (cf. FIGS. 3 and 4).

At block 7001, a persistent allocation of first resources to a first channel is implemented. This may include resolving the respective resources for use of communicating on the first channel at the transmitting device and/or the receiving device.

Optionally, at block 7002, signal(s) and/or data are communicated on the first resources. The signal(s) and/or data can be communicated upon arrival at a transmit buffer, without the need of additionally scheduling. For this, the first resources may be re-occurring over time such that they are ready to access upon a need of communicating the signal(s) and/or data on the first channel.

At optional block 7003, it is checked whether the persistent allocation should be overridden. For example, at block 7003, receipt of an override control information (cf. FIG. 10: block 3004) could be monitored.

For example, the override control information can be implemented by an indication of the transmission frame type—which can be transmitted by the access node such as a BS supporting the wireless link. The procedure may involve to transmit the indication of frame type, followed by the event driven signal(s) and/or data on the same or other frequency, addressed to one or more UEs.

Other trigger criteria for activating the override are conceivable at 7003. For example, the activation of the override 7003 can be event driven. For example, overriding the persistent allocation can be in response to a need of communicating data on a second channel. For this, at block 7003, receipt of signal(s) and/or data in a transmit buffer associated with the second channel could be monitored.

Next, at block 7004, the persistent allocation is temporarily overridden—e.g., for certain time duration (cf. FIG. 8: time duration 289).

Then, while overriding, at block 7005, a dedicated allocation of second resources to a second channel is implemented. This may include reserving the respective resources for communicating on the second channel at the transmitting device and/or the receiving device.

As a general rule, the first channel and the second channel can be of the same or different directivity. As a further general rule, the first channel and the second channel can be between the same or different devices. Both channels may be supported by a common access node such as a BS (cf. FIG. 1, BS 112).

The overriding is for a subset of the first resources. The subset of the first resources cropped from the first resources (cf. FIG. 7) may be redistributed from the first resources to the second resources (cf. FIG. 9). Cropping may include using shortened transmission frames.

Next, at optional block 7006, signal(s) and/or data are communicated on the second resources. This may be a broadcast or one-to-one communication.

Here, the same or different frequencies may be used for communicating if compared to a scenario in which overriding has not been triggered.

If there is a deviating frequency hopping pattern used for the persistent resources 281 and the dedicated resources 282, the transmitting device and the receiving device adjust their receiver properties accordingly.

At optional block 7007, it is checked whether a timeout of the override has occurred; if not, then the override at block 7004 is still active; otherwise, the method commences with block 7002.

To summarize techniques are described in which pre-allocated resources of a persistent allocation are used, e.g., for payload data channels; these resources can be re-allocated in an event-driven fashion to be used for, e.g., control signaling purpose. The re-allocation can be done by using a different frame type, or by skipping dedicated resource allocation. One particular implementation could be if the pre-allocated resources is using a frequency hopping scheme while the inserted control channel occurs in another frequency than the pre-allocated resources.

Thereby, an on-demand transmission gap can be created, e.g., for control signaling. The transmission gap can be created in a pre-allocated data transmission slot, in a frequency hopping system.

Various use cases are conceivable for such techniques.

In one example use case, the dedicated allocation is for a system that is utilizing separate WUS for idle mode UEs. Such UEs may during the idle mode only listen for a specific WUS and may not be involved in listening or transmitting on the other channels that are active within the system. In such a system the wake-up channel for communicating the WUSs may not have resources of a persistent allocation, but may be inserted in an event driven manner when there is one or more UEs to wake up. In such scenario, the WUS could be communicated in response to overriding a persistent allocation, to implement a dedicated allocation for the WUS. In such an example, UEs that are not in idle mode and that are active in the cell will not listen to the wake-up control channel when overriding.

Another example use case relates to a system operating with as little control signaling as possible. Such a system may only use a persistent allocation for periodic control signals, e.g., for synchronization signals on a synchronization control channel and perhaps a few other main signaling blocks. Any other signal(s) and/or data may be occasionally inserted when needed, by overriding the persistent allocation. Contrary to the above example of wake-up control channel using the dedicated allocation, in this example any signal(s) and/or data communicated on resources of the dedicated allocation are assumed to be received by at least some of the active devices in the cell, i.e., UEs operating in connected mode and not in idle mode.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described in which the resources allocated by the persistent allocation are different or at least partly different from the resources allocated by the dedicated allocation. In other examples, it would be possible that these resources are the same.

The invention claimed is:

1. A method of operating a device, comprising:
   implementing a persistent allocation of a plurality of first resources to a first channel of a wireless link supported by an access node,
   temporarily overriding the persistent allocation for a subset of the plurality of first resources, and
   while overriding: implementing a dedicated allocation of a plurality of second resources to a second channel of the wireless link,
   wherein said overriding comprises cropping the subset of the plurality of first resources from the plurality of first resources,
   wherein the plurality of second resources are time-aligned with the cropped subset of the plurality of first resources; and
   wherein a frame structure for the dedicated allocation is different from that for the persistent allocation.

2. The method of claim 1,
   wherein the first channel comprises a payload channel, and wherein the second channel comprises a control channel.

3. The method of claim 1, wherein said cropping of the subset of the plurality of first resources comprises using a shortened transmission frame of a transmission protocol implemented on the wireless link to create a transmission gap of communication on the first channel associated with the subset of the plurality of first resources, and wherein the plurality of second resources is time-aligned with the transmission gap.

4. The method of claim 1,
   wherein the plurality of first resources is included in a sequence of first transmission frames of a transmission protocol implemented on the wireless link, the first transmission frames having at least one first frame structure,
   wherein the plurality of second resources is included in at least one second transmission frame of the transmission protocol, the at least one second transmission frame having at least one second frame structure different from the at least one first frame structure.

5. The method of claim 4,
   wherein the at least one second frame structure is associated with shorter transmission frames if compared to the at least one first frame structure.

6. The method of claim 4,
   wherein an amount of first resources per transmission frame is larger for the at least one first frame structure than for the at least one second frame structure, and/or
   wherein an amount of second resources per transmission frames is zero in the at least one first frame structure.

7. The method of claim 1,
   wherein said overriding comprises blocking communication on the first channel in the subset of the plurality of first resources and using the subset of the plurality of first resources as the plurality of second resources.

8. The method of claim 7,
   wherein blocking communication on the first channel in the subset of the plurality of first resources comprises blocking downlink control information for the first channel.

9. The method of claim 7,
   wherein said blocking of the communication comprises temporarily redistributing the subset of the plurality of first resources from the persistent allocation to the dedicated allocation.

10. The method of claim 1,
    wherein the persistent allocation of the plurality of first resources uses a first frequency hopping pattern,
    wherein the dedicated allocation of the plurality of second resources uses a second frequency hopping pattern which is different from the first frequency hopping pattern.

11. The method of claim 10,
    wherein a first hopping range of the first frequency hopping pattern is larger than a second hopping range of the second frequency hopping pattern.

12. The method of claim 1,
    wherein the persistent allocation of the plurality of first resources uses a frequency hopping pattern,
    wherein the dedicated allocation of the plurality of second resources uses a fixed frequency.

13. The method of claim 1,
    wherein said overriding is signaled using override control information communicated using at least one of (i) a downlink control channel of the wireless link and (ii) a transmission frame header of a transmission frame of a transmission protocol implemented on the wireless link.

14. The method of claim 13,
    wherein said overriding is implicitly signaled by omitting downlink control information for the first channel.

15. The method of claim 13,
    wherein the override control information is indicative of a duration of said overriding.

16. The method of claim 1,
    wherein said overriding of the persistent allocation is in response to a need of communicating on the second channel.

17. The method of claim 1,
    wherein the second channel comprises a control channel, wherein the control channel comprises at least one of a mobility control channel, a paging control channel, and a wake-up control channel.

18. The method of claim 1,
    wherein the first channel has a first directivity of communication with respect to the access node, wherein the second channel has a second directivity of communication with respect to the access node,
wherein the first directivity is the same as the second directivity.

19. The method of claim 1,
wherein the first channel is an uplink channel between the access node and a first terminal,
wherein the second channel is a downlink channel between the access node and a second terminal.

20. A device configured to:
implement a persistent allocation of a plurality of first resources to a first channel of a wireless link supported by an access node,
temporarily override the persistent allocation for a subset of the plurality of first resources, and
while overriding: implement a dedicated allocation of a plurality of second resources to a second channel of the wireless link
wherein said overriding comprises cropping the subset of the plurality of first resources from the plurality of first resources, and
wherein the plurality of second resources are time-aligned with the cropped subset of the plurality of first resources; and
wherein a frame structure for the dedicated allocation is different from that for the persistent allocation.

\* \* \* \* \*